United States Patent
Smith, III et al.

(10) Patent No.: US 10,691,811 B2
(45) Date of Patent: Jun. 23, 2020

(54) ENCRYPTION TRANSITION IN A DATABASE

(71) Applicant: HEWLETT PACKARD ENTERPRISE DEVELOPMENT LP, Houston, TX (US)

(72) Inventors: Philip Smith, III, Herndon, VA (US); Terence Spies, Cupertino, CA (US)

(73) Assignee: Micro Focus LLC, Santa Clara, CA (US)

( * ) Notice: Subject to any disclaimer, the term of this patent is extended or adjusted under 35 U.S.C. 154(b) by 709 days.

(21) Appl. No.: 15/420,589

(22) Filed: Jan. 31, 2017

(65) Prior Publication Data
US 2018/0218159 A1    Aug. 2, 2018

(51) Int. Cl.
*G06F 21/62* (2013.01)
*G06F 21/60* (2013.01)
*G06F 16/25* (2019.01)

(52) U.S. Cl.
CPC .......... *G06F 21/602* (2013.01); *G06F 16/258* (2019.01); *G06F 21/6227* (2013.01); *G06F 2221/2107* (2013.01)

(58) Field of Classification Search
CPC .................................................. G06F 21/602
USPC ........................................................ 713/189
See application file for complete search history.

(56) References Cited

U.S. PATENT DOCUMENTS

| | | | |
|---|---|---|---|
| 8,949,625 B2 | 2/2015 | Spies et al. | |
| 9,209,974 B1 | 12/2015 | Akinyele et al. | |
| 9,313,023 B1 | 4/2016 | Murray | |
| 9,489,521 B2 | 11/2016 | Martin et al. | |
| 2004/0243816 A1* | 12/2004 | Hacigumus | H04L 9/0894 713/193 |
| 2015/0134972 A1* | 5/2015 | Martin | G06F 21/602 713/189 |
| 2016/0218860 A1* | 7/2016 | Murray | H04L 9/0618 |

OTHER PUBLICATIONS

Mihir, Bellare et al., "Format-Preserving Encryption," Mar. 27, 2010, University of California Dept. of Computer Science, Available at: <eprint.iacr.org/2009/251.pdf>, 25 pages.

* cited by examiner

*Primary Examiner* — Malcolm Cribbs
*Assistant Examiner* — Angela R Holmes

(57) ABSTRACT

A computing device includes a processor and a machine-readable storage medium storing instructions. The instructions are executable by the processor to: initiate a transition mode in a database comprising a plurality of data elements; and responsive to a first query for a first data element during the transition mode, determine whether the first data element is already encrypted in the database. The instructions are further executable to, responsive to a determination that the first data element is already encrypted in the database: decrypt the first data element, and return the decrypted first data element to the first query. The instructions are further executable to, responsive to a determination that the first data element is not already encrypted in the database: return the first data element to the first query without decryption, and encrypt the first data element in the database.

17 Claims, 7 Drawing Sheets

ENCRYPTION TRANSITION IN A DATABASE

BACKGROUND

A database includes a collection of data. The data included in a database may be stored and retrieved using a computer program such as a database management system (DBMS). One type of database is a relational database, which stores information in tables. A table is a series of intersecting rows and columns. The rows of a table may represent records, which are collections of information about particular items. The columns of a table may represent fields, which specify particular attributes of a record.

BRIEF DESCRIPTION OF THE DRAWINGS

Some implementations are described with respect to the following figures.

DETAILED DESCRIPTION

Some databases may store data in an encrypted form. For example, a company may store business records in a database, and may encrypt data that includes sensitive or confidential information (e.g., social security numbers, bank account identifiers, health data, and so forth). In some examples, applications may interact with the database to access the encrypted data. Such applications may include functions or interfaces to allow the application to access and decrypt an encrypted data element.

In some examples, it may be desired to convert an existing database storing unencrypted data (e.g., "cleartext") to instead store encrypted data. For example, the existing database may be taken offline, and all records may be encrypted while the database is offline. However, because the database is not available for use while it is offline, a user of the database may be negatively affected. For example, a retailer using the database to store purchase transaction data may have to shut down or turn away potential sales during the offline period.

In accordance with some implementations, examples are provided for an encryption transition period of a database. As described further below with reference to FIGS. 1-6, some implementations may include a transition setting associated with a database. The transition setting may be set to initiate or enter a transition mode in the database. During the transition mode, the database may include both encrypted and unencrypted data elements. Further, the database may receive a query for a data element during the transition mode. In response to the query, the database may determine whether the data element is already encrypted. If the data element is already encrypted, the database may decrypt and return the data element. Otherwise, if the data element is not already encrypted, the database may return the data element without decryption, and may encrypt the data element in the database. In this manner, some implementations may allow the database to be gradually encrypted without having to be taken offline, and without requiring special coding to handle both types of data. In some implementations, once the database is sufficiently encrypted, the transition mode may be exited, and an encryption mode may be initiated. In some examples, the encryption mode may involve attempting to decrypt all data elements retrieved for a query, without first determining whether each data element is already encrypted.

Figure 1:
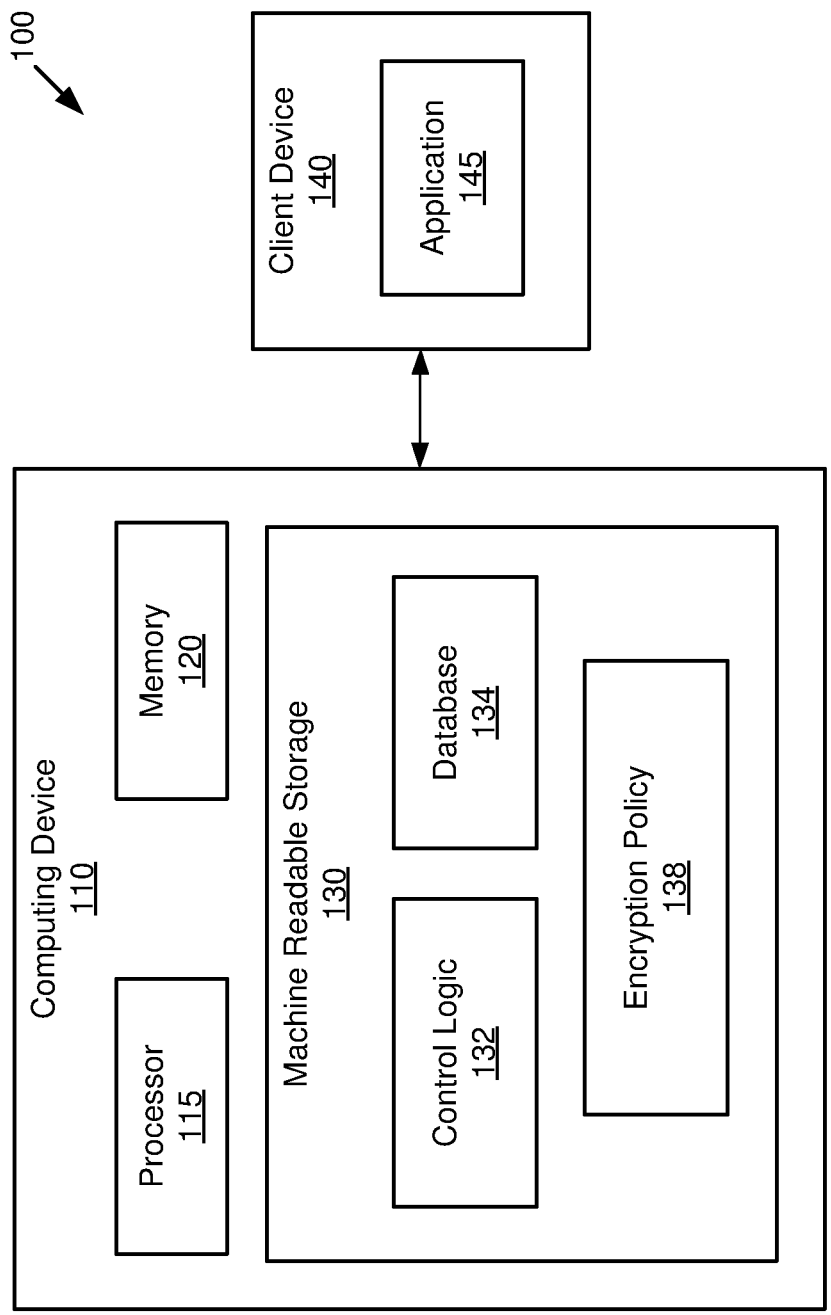
FIG. 1 is a schematic diagram of an example system, in accordance with some implementations.

FIG. 1 shows a schematic diagram of an example system 100, in accordance with some implementations. As shown, in some implementations, the system 100 may include a computing device 110 and a client device 140. The computing device 110 may be, for example, a server, a storage device, a desktop computer, a laptop, and so forth. Further, the computing device 110 may be any grouping of related or interconnected devices, such as a blade server, a computing cluster, and so forth.

In some implementations, the computing device 110 can interface with the client device 140. For example, the client device 140 may be a terminal or computer that is connected to the computing device via a wired or wireless network. In other examples, the client device 140 may comprise a display screen coupled to (or included in) the computing device 110. In some implementations, an application 145 may be executed by a processor (not shown) of the client device 140. The application 145 may interface with the database 134 to read and/or write data. In some implementations, an application 145 may receive or generate queries for database 134. Further, in some implementations, the application 145 may display or output information to a user based on data received from the database 134. For example, in some implementations, the application 145 may provide an interface to receive queries from a user, and to display the corresponding query results. Although not shown in FIG. 1, in some implementations, the client device 140 may a processor, memory, and/or a machine-readable storage.

As shown, the computing device 110 can include a processor 115, memory 120, and machine-readable storage 130. The processor 115 can include one or more of a microprocessor, microcontroller, processor module or subsystem, programmable integrated circuit, programmable gate array, multiple processors, a microprocessor including multiple processing cores, or another control or computing device. The memory 120 can be any type of computer memory (e.g., dynamic random access memory (DRAM), static random-access memory (SRAM), etc.).

In some implementations, the machine-readable storage 130 can include non-transitory storage media such as hard drives, flash storage, optical disks, etc. As shown, the machine-readable storage 130 can include control logic 132, a database 134, and an encryption policy 138. The control logic 132 may include any instructions (e.g. software application(s)) that execute on the processor 115. In some implementations, the database 134 may be stored in any type of data structure (e.g., a relational database, an object database, an extensible markup language (XML) database, a flat file, a data warehouse, and so forth).

In some implementations, the control logic 132 may receive queries or data requests from the application 145 of the client device 140. The control logic 132 may execute the received queries to read or access data stored in the database 134, and may return the query results to the application 145. In some implementations, the database 134 may include encrypted data and unencrypted data. Further, the control logic 132 can encrypt data being stored in the database 134, and can decrypt data being retrieved from the database 134.

Assume that, at a first point in time, a data set in the database 134 is unencrypted. For example, the data set may include a portion of the database, a data type, a data field, the entire database, etc. Assume further that the database 134 is to be modified such that the data set is encrypted. The process of transitioning a data set of the database 134 from unencrypted form to encrypted form may be referred to herein as an "encryption transition."

In some implementations, the encryption policy 138 may indicate an encryption transition for a data set of the database 134. For example, in some implementations, the encryption policy 138 may be setting or flag indicating that a particular data set is to be encrypted. In some implementations, the control logic 132 may detect an encryption transition, and in response may initiate a transition mode in the database 134.

In some implementations, the transition mode may be an operating mode or state in which the execution of queries is modified to perform the encryption transition. For example, during a transition mode, the execution of a query may be automatically modified to handle both encrypted and unencrypted data, but without requiring any modification to the query itself. Thus, in some implementations, the application 145 can use queries of the same format or coding without regard to whether the database 134 includes only unencrypted data, only encrypted data, or a combination of both.

Further, in some implementations, the execution of a query for a data element may include the encryption of any unencrypted instances of the data element in the database 134. Thus, in some implementations, the database 134 may become encrypted in a gradual manner as queries for various data elements are received over time. In some implementations, such gradual encryption may allow the database 134 to remain online (i.e., available for use) during the encryption transition.

In some implementations, a query may return all instances of a requested data element that are included in the database 134. In some implementations, during the transition mode, a single set of query results may include any unencrypted instances of the requested data element, and may also include decrypted versions of any encrypted instances of the requested data element. In some implementations, a single interface may be used to return the set of query results, including both unencrypted data elements (i.e., data elements that were not previously encrypted) and decrypted data elements (i.e., data elements that were encrypted and have been decrypted). For example, in some implementations, such query results may be presented as a single output in an interface of the application 145.

In some implementations, a transition mode may be exited after completion of some or all of an encryption transition. For example, the control logic 132 and/or the encryption policy 138 may automatically terminate the transition mode in response to a determination that a database metric has reached a defined threshold (e.g., a target percentage of data is encrypted, all data is encrypted, a time period has elapsed, etc.). In another example, a user may manually set or modify the encryption policy 138 to terminate the transition mode of the database 134.

In some implementations, after exiting the transition mode, the database 134 may operate in an encryption mode. Further, in some implementations, during the encryption mode, the execution of each query may involve attempting to decrypt all data elements retrieved for the query, without first determining whether each data element is already encrypted. In some implementations, if a query attempts to access an unencrypted data element during the encryption mode, the query may return an error corresponding to the data element. Further, in some implementations, during the transition mode or the encryption mode, a data operation to insert or modify a data element may include automatically encrypting the data element.

In some implementations, the database 134 may not enter or exit a transition mode or an encryption mode. Instead, in such implementations, the database 134 may always operate in the same manner as the transition mode described above. For example, in such implementations, execution of a query for a data element may always involve determining whether the data element is already encrypted in the database 134. Further, if the data element is already encrypted, the database 134 may decrypt and return the data element. Otherwise, if the data element is not already encrypted, the data element may be returned without decryption, and may the data element may be encrypted in the database 134. In such examples, the computing device 110 may not include the encryption policy 138.

Figure 2A:
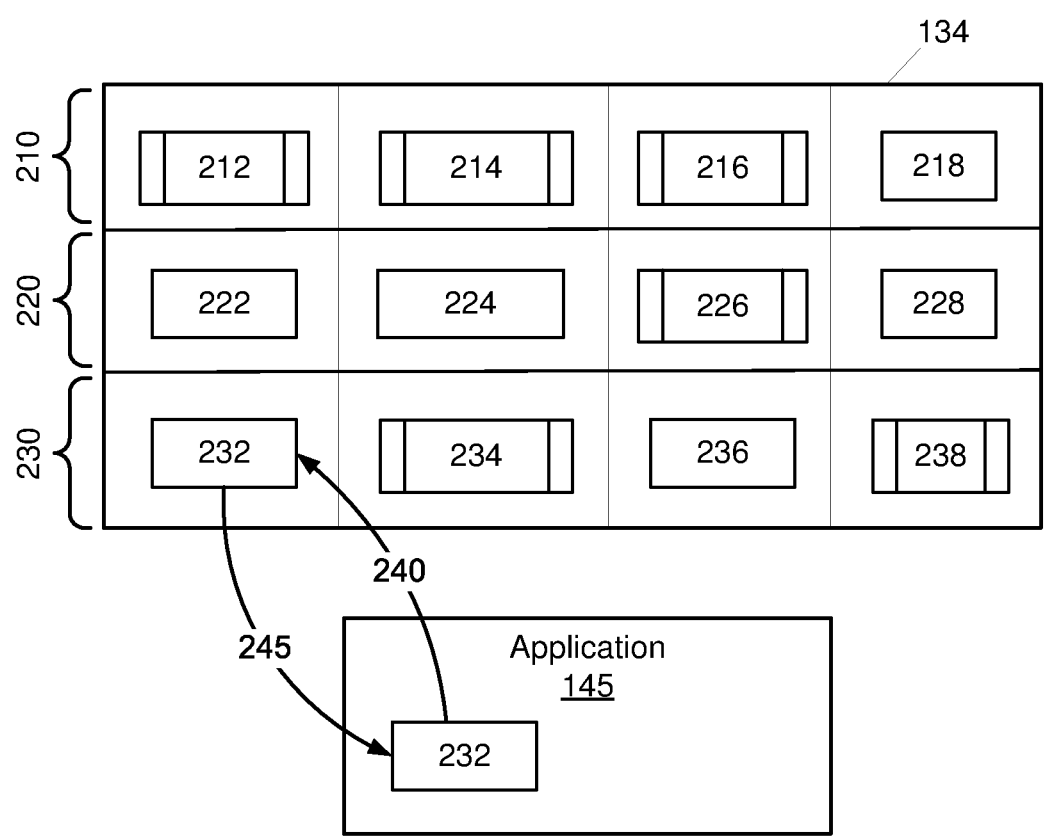
FIGS. 2A-2B are illustrations of example database operations in accordance with some implementations.
Figure 2B:
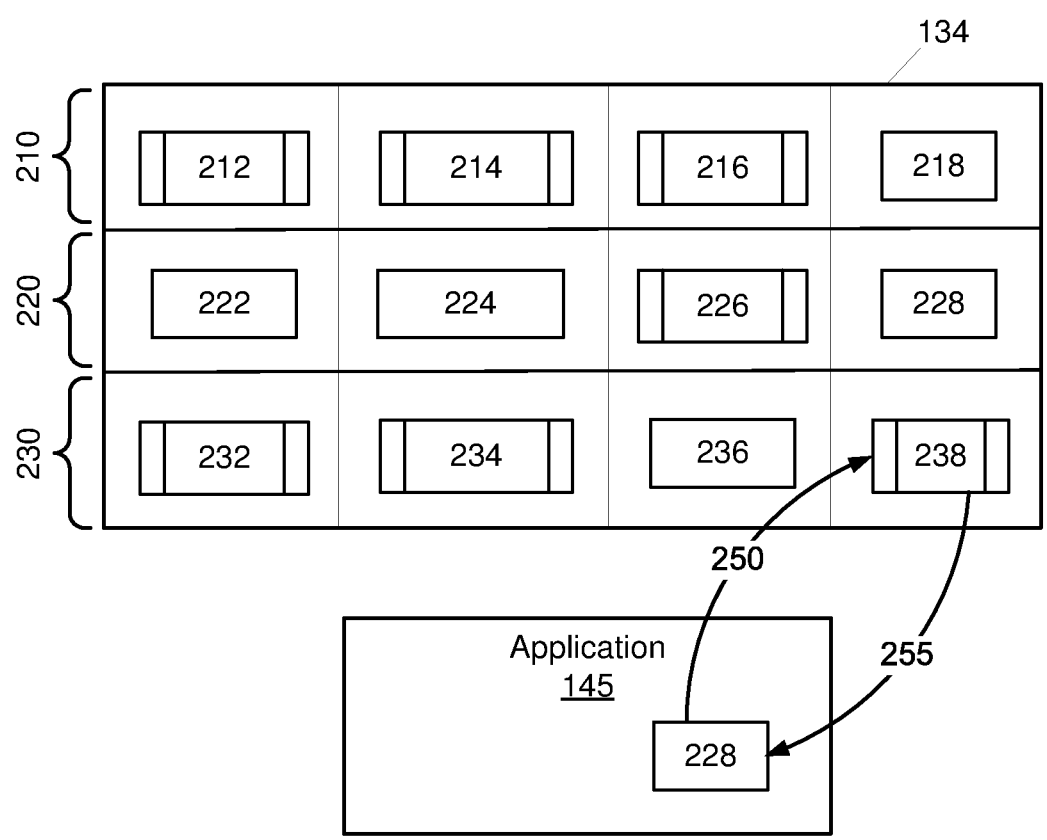

Referring now to FIGS. 2A-2B, shown are illustrations of example database operations in accordance with some implementations. Assume that FIG. 2A corresponds to a first point in time, and that FIG. 2B corresponds to a later point in time. Assume further that, in the examples of FIGS. 2A-2B, the database 134 is in a transition mode in accordance with some implementations.

Referring to FIG. 2A, the database 134 may include a first record 210, a second record 220, and a third record 230. The first record 210 includes data elements 212, 214, 216 that are encrypted (as indicated by double-line sides), and a data element 218 that is unencrypted (as indicated by single-line sides). Further, the second record 220 includes encrypted data element 226 and unencrypted data elements 222, 224, 228. Furthermore, the third record 230 includes encrypted data elements 234, 238 and unencrypted data elements 232, 236.

As shown in FIG. 2A, the application 145 may send a query 240 to read data element 232 from the database 134. In some implementations, because the database 134 is in a transition mode, a determination is made as to whether the data element 232 is already encrypted. In response to a determination that the data element 232 is not already encrypted, the database 134 does not attempt to decrypt the data element 232, and instead returns the cleartext (i.e., unencrypted data) of data element 232 as a query result 245 to the application 145. Further, in some implementations, the data element 232 may be encrypted (not shown) in the database 134 as part of (or in conjunction with) executing the query 240.

Referring now to FIG. 2B, shown is the database 134 at a second point in time (i.e., after completing the query 240 shown in FIG. 2A). Thus, the data element 232 is indicated to be encrypted in the example of FIG. 2B. As shown, the application 145 may send a query 250 to read data element 238 from the database 134. In some implementations, because the database 134 is in a transition mode, a determination is made as to whether the data element 238 is already encrypted. In response to a determination that the data element 238 is already encrypted, the database 134 decrypts the data element 238, and returns the decrypted data element 238 as a query result 255 to the application 145.

In some implementations, the data elements (e.g., strings, numbers, values, etc.) in the database 134 may be encrypted using format-preserving encryption (FPE). In some implementations, when using FPE, the existing format of the data element is not changed during the encryption or decryption process. For example, a string that is encrypted using FPE may maintain the same length and/or format as prior to encryption.

In some implementations, a data element encrypted using FPE may include embedded key information. In some implementations, the embedded key information may describe or identify the encryption key that was used to encrypt that particular data element. For example, referring to FIG. 2B, assume that encrypted data element 234 includes embedded information identifying the encryption key "A" that was used to encrypt data element 234 using FPE. Further, assume that encrypted data element 238 includes embedded information identifying the encryption key "B" that was used to encrypt data element 238 using FPE.

Note that, while FIGS. 1-2B show example implementations, other implementations are possible. For example, it is contemplated that the client device 140 and the computing device 110 may be implemented in a single device, or in arrangements that are different from that shown in FIG. 1. In another example, it is contemplated that the client device 140 and/or the computing device 110 may include additional components. In yet another example, it is contemplated that the database 134 may have any number of records, may include additional fields, may have fewer fields, may use any data format, and so forth. Other combinations and/or variations are also possible.

Figure 3:
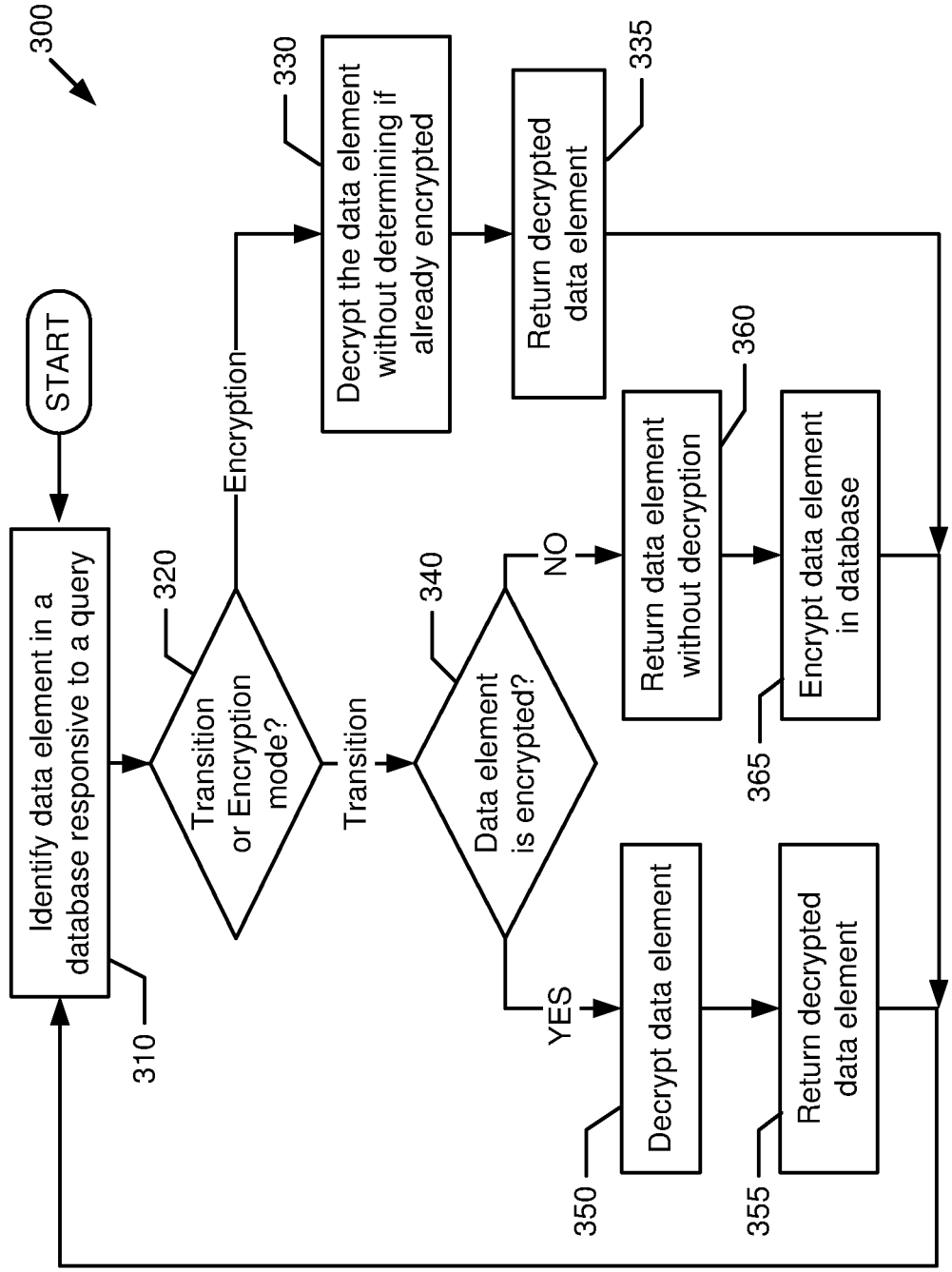
FIG. 3 is a flow diagram of an example process for data encryption, in accordance with some implementations.

Referring now to FIG. 3, shown is an example process 300 for data encryption, in accordance with some implementations. The process 300 may be performed by the system 100 shown in FIG. 1. The process 300 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 300 may be described below with reference to FIGS. 1-2B, which show examples in accordance with some implementations. However, other implementations are also possible.

At block 310, a data element may be identified in a database responsive to a query. For example, referring to FIGS. 1-2A, the control logic 132 may receive the query 240, and in response may identify the data element 232 in the database 134.

At diamond 320, a determination is made as to whether the database is in a transition mode or an encryption mode. For example, referring to FIG. 1, the control logic 132 may interact with the encryption policy 138 to determine whether the database 134 is in a transition mode or an encryption mode.

If it is determined at diamond 320 that the database 134 is in a transition mode, then at diamond 340, a determination is made as to whether the data element is already encrypted in the database. For example, referring to FIGS. 1-2A, the control logic 132 may determine whether the data element 232 is encrypted in the database 134.

If it is determined at diamond 340 that the data element is not already encrypted in the database, then at block 360, the data element may be returned in a query result without being decrypted. At block 365, the data element may be encrypted in the database. For example, referring to FIGS. 1-2A, the control logic 132 may not attempt to decrypt the data element 232, and instead may return data element 232 as the query result 245. In some implementations, the control logic 132 data may encrypt the element 232 in the database 134. After block 365, in some implementations, the process 300 may return to block 310 (e.g., to identify another data element responsive to a query).

However, if it is determined at diamond 340 that the data element is already encrypted in the database, then at block 350, the data element may be decrypted. At block 355, the decrypted data element may be returned in a query result. For example, referring to FIGS. 1-2B, the control logic 132 may decrypt the encrypted data element 238, and may return the decrypted data element 238 in the query result 255. After block 355, in some implementations, the process 300 may return to block 310 to identify another data element.

However, if it is determined at diamond 320 that the database 134 is in an encryption mode, then at block 330, the data element may be decrypted. At block 335, the decrypted data element may be returned as a query result. For example, referring to FIGS. 1-2B, the control logic 132 may determine that a database metric has reached a defined threshold (e.g., percentage of data encrypted). In response, the control logic 132 may terminate the transition mode and initiate an encryption mode. During the encryption mode, the control logic 132 may decrypt the encrypted data element 238 without determining whether it is already encrypted, and may return the decrypted data element 238 in the query result 255. After block 335, in some implementations, the process 300 may return to block 310 to identify another data element.

Figure 4:
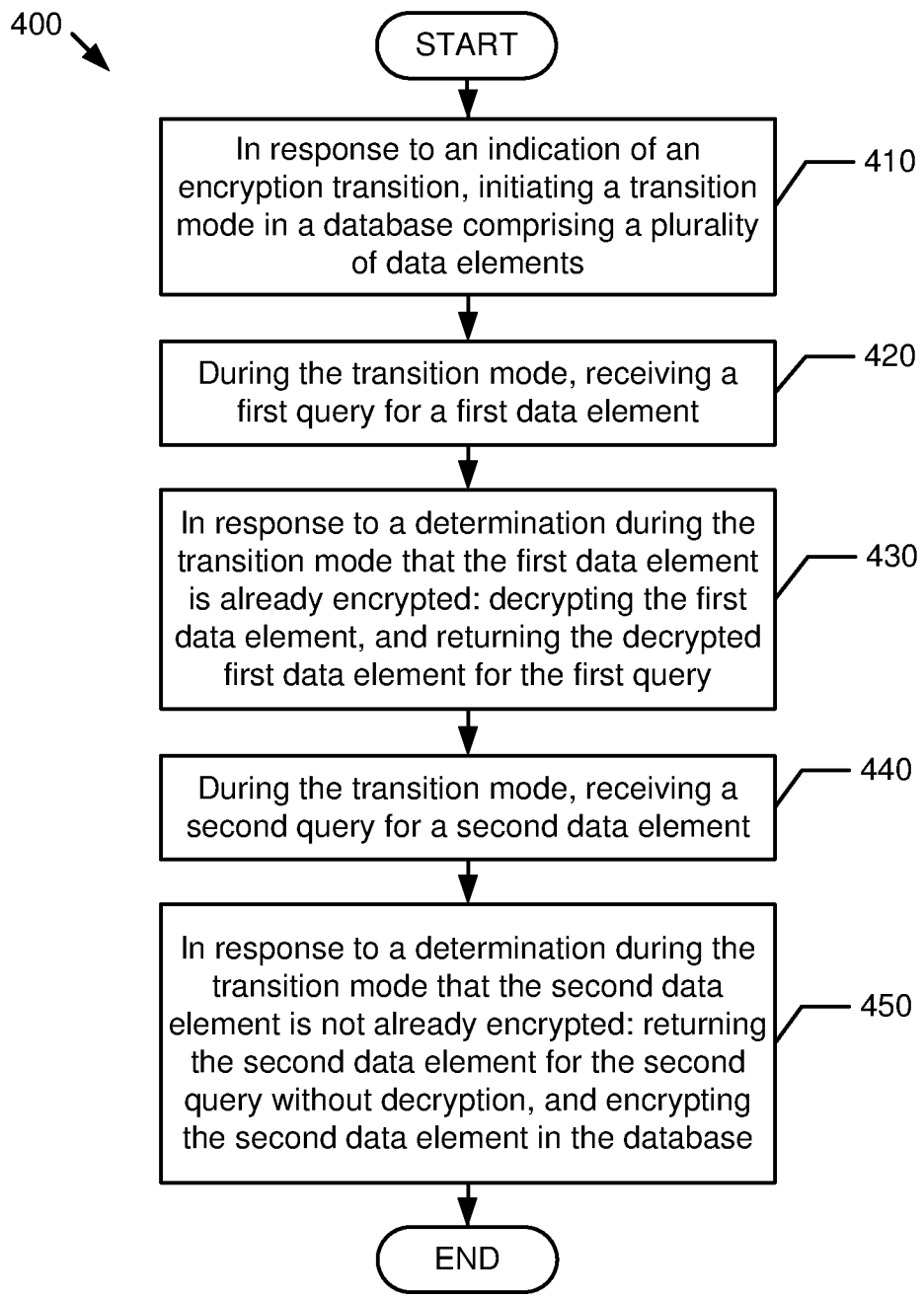
FIG. 4 is a flow diagram of an example process for data encryption, in accordance with some implementations.

Referring now to FIG. 4, shown is an example process 400 for data encryption, in accordance with some implementations. The process 400 may be performed by the system 100 shown in FIG. 1. The process 400 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to FIGS. 1-2B, which show examples in accordance with some implementations. However, other implementations are also possible.

At block 410, in response to an indication of an encryption transition, a transition mode may be initiated. For example, referring to FIG. 1, the control logic 132 may initiate a transition mode in the database 134. In some implementations, the transition mode may be initiated using the encryption policy 138.

At block 420, a first query for a first data element may be received during the transition mode. For example, referring to FIGS. 1-2B, the control logic 132 may receive the query 250 for the data element 238 in the database 134.

At block 430, in response to a determination during the transition mode that the first data element is already encrypted, the first data element may be decrypted, and the decrypted first data element may be returned for the first query. For example, referring to FIGS. 1-2B, the control logic 132 may determine that the data element 238 is already encrypted in the database 134, and in response may decrypt the encrypted data element 238, and return the decrypted data element 238 in the query result 255.

At block 440, a second query for a second data element may be received during the transition mode. For example, referring to FIGS. 1-2A, the control logic 132 may receive the query 240 for the data element 232 in the database 134.

At block 450, in response to a determination during the transition mode that the second data element is not already encrypted, the second data element may be returned for the second query without decryption, and the second data element may be encrypted in the database. For example, referring to FIGS. 1-2B, the control logic 132 may not attempt to decrypt the data element 232, and instead may return data element 232 as the query result 245. Further, in some implementations, the control logic 132 may encrypt the data element 232 in the database 134. In some implementations, the control logic 132 may encrypt the data element 232 using format-preserving encryption. Further, in some implementations, the control logic 132 may embed key information in the encrypted data element 232. After block 450, the process 400 is completed.

Figure 5:
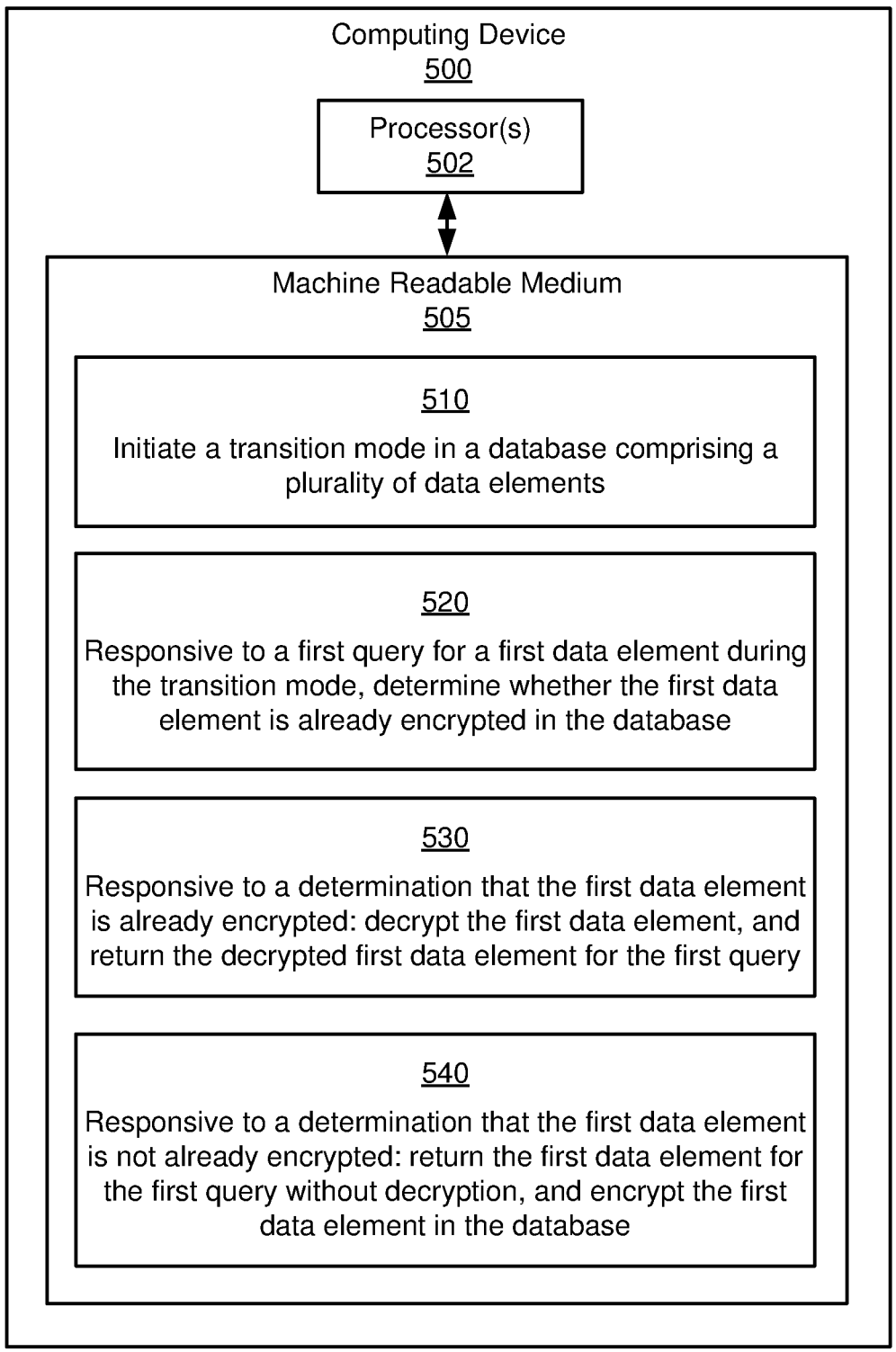
FIG. 5 is a schematic diagram of an example computing device, in accordance with some implementations.

Referring now to FIG. 5, shown is a schematic diagram of an example computing device 500. In some examples, the computing device 500 may correspond generally to the computing device 110 shown in FIG. 1. As shown, the computing device 500 may include a hardware processor(s) 502 and machine-readable storage medium 505. The machine-readable storage medium 505 may be a non-transitory medium, and may store instructions 510-550. The instructions 510-550 can be executed by the hardware processor(s) 502.

Instruction 510 may initiate a transition mode in a database comprising a plurality of data elements. Instruction 520 may, responsive to a first query for a first data element during the transition mode, determine whether the first data element is already encrypted in the database.

Instruction 530 may, responsive to a determination that the first data element is already encrypted: decrypt the first data element, and return the decrypted first data element for the first query. Instruction 540 may, responsive to a determination that the first data element is not already encrypted, return the first data element for the first query without decryption, and encrypt the first data element in the database.

Figure 6:
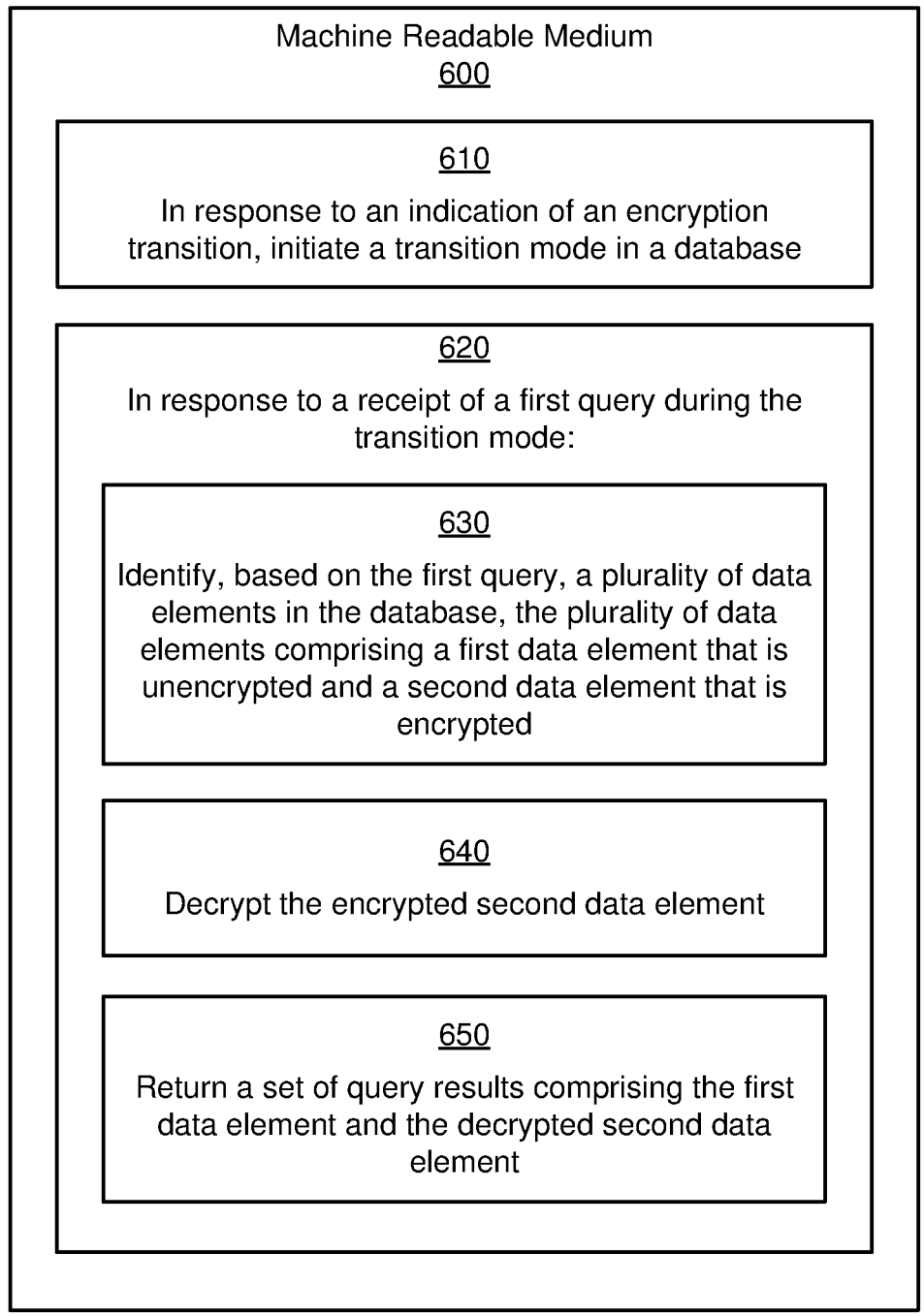
FIG. 6 is a diagram of an example machine-readable storage medium storing instructions in accordance with some implementations.

Referring now to FIG. 6, shown is a machine-readable storage medium 600 storing instructions 610-650, in accordance with some implementations. The instructions 610-650 can be executed by any number of processors (e.g., the processor 115 shown in FIG. 1). The machine-readable storage medium 600 may be any non-transitory computer readable medium, such as an optical, semiconductor, or magnetic storage device.

As shown, instruction 610 may, in response to an indication of an encryption transition, initiate a transition mode in a database. Instruction 620 may, in response to a receipt of a first query during the transition mode, cause execution of instructions 630, 640, and 650.

Instruction 630 may identify, based on the first query, a plurality of data elements in the database, the plurality of data elements comprising a first data element that is unencrypted and a second data element that is encrypted. Instruction 640 may decrypt the encrypted second data element. Instruction 650 may return a set of query results comprising the first data element and the decrypted second data element.

In accordance with some implementations, examples are provided for an encryption transition of a database. Some implementations include a transition setting associated with a database. The transition setting may be set to initiate or enter a transition mode in the database. The database in the transition mode may, in response to a query for a data element, determine whether the data element is already encrypted. If the data element is already encrypted, the database may decrypt and return the data element. However, if the data element is not already encrypted, the database may return the data element without decryption, and may encrypt the data element in the database. In this manner, some implementations may allow the database to be gradually encrypted without having to be taken offline, and without requiring special coding to handle both types of data.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method for data encryption, comprising:
   in response to an indication of an encryption transition, initiating a transition mode in a database system comprising a database of data elements including first and second data elements;
   during the transition mode, the database system receiving a first query to retrieve the first data element from the database;
   in response to receiving the first query, the database system determining whether the first data element is already encrypted in the database;
   in response to a determination during the transition mode that the first data element is already encrypted in the database:
     the database system decrypting the first data element that is already encrypted in the database; and
     the database system returning the decrypted first data element in a query result of the first query;
   during the transition mode, the database system receiving a second query to retrieve the second data element from the database;
   in response to receiving the second query, the database system determining whether the second data element is already encrypted in the database;
   in response to a determination during the transition mode that the second data element is not already encrypted in the database:

the database system returning the second data element in a query result of the second query without decryption; and the database system encrypting the second data element in the database; and in response to a determination that a metric of the database system has reached a defined threshold, changing the database system from the transition mode to an encryption mode that includes performing queries without determining whether data elements in the queries are encrypted in the database.

2. The method of claim 1, further comprising, during the encryption mode:

the database system receiving a third query to retrieve a third data element from the database;

in response to a receipt of the third query during the encryption mode, the database system decrypting the third data element without a determination as to whether the third data element is encrypted in the database; and the database system returning the decrypted third data element in a query result of the third query.

3. The method of claim 1, wherein encrypting the second data element in the database comprises using format-preserving encryption.

4. The method of claim 3, wherein encrypting the second data element in the database comprises embedding key information in the encrypted second data element.

5. The method of claim 1, wherein, prior to initiating the transition mode, each data element in the database is not encrypted.

6. The method of claim 1, wherein, after exiting the transition mode, at least a particular percentage of the data elements in the database are encrypted.

7. An article comprising a non-transitory machine-readable storage medium storing instructions that upon execution cause a processor to:

in response to an indication of an encryption transition, initiate a transition mode in a database storing a plurality of data elements including a first data element;

in response to a receipt during the transition mode of a first query to retrieve the first data element from the database, determine whether the first data element is already encrypted in the database;

responsive to a determination that the first data element is already encrypted in the database:
   decrypt the first data element; and
   return the decrypted first data element as a query result for the first query;

responsive to a determination that the first data element is not already encrypted in the database:
   return the first data element without decryption as the query result for the first query; and
   encrypt the first data element in the database; and responsive to a determination that a database metric has reached a defined threshold, change the database from the transition mode to an encryption mode that includes performing queries without determining whether data elements in the queries are encrypted in the database.

8. The article of claim 7, wherein, prior to initiating the transition mode, each data element in the database is not encrypted.

9. The article of claim 7, wherein the first data element is encrypted using format-preserving encryption.

10. The article of claim 9, wherein, after exiting the transition mode, at least a particular percentage of the data elements in the database are encrypted.

11. The article of claim 7, wherein the instructions to encrypt the first data element in the database comprise instructions to embed key information in the encrypted first data element.

12. The article of claim 7, wherein the instructions further cause the processor to, during the encryption mode:

receive a second query to retrieve a second data element from the database;

in response to a receipt of the second query, decrypt the second data element without a determination as to whether the second data element is encrypted in the database; and return the decrypted second data element in a result of the second query.

13. A computing device comprising:

a hardware processor; and a machine-readable storage medium storing instructions, the instructions executable by the hardware processor to:

initiate a transition mode in a database comprising a plurality of data elements including a first data element;

responsive to a receipt during the transition mode of a first query to retrieve the first data element from the database, determine whether the first data element is already encrypted in the database;

responsive to a determination that the first data element is already encrypted in the database:
   decrypt the first data element; and
   return the decrypted first data element to the first query;

responsive to a determination that the first data element is not already encrypted in the database:
   return the first data element to the first query without decryption; and
   encrypt the first data element in the database; and responsive to a determination that a metric of the database has reached a defined threshold, change the database from the transition mode to an encryption mode that includes performing queries without determining whether data elements in the queries are encrypted in the database.

14. The computing device of claim 13, the instructions further executable to, during the encryption mode:

receive a second query to retrieve a second data element from the database;

in response to a receipt of the second query, decrypt the second data element without a determination as to whether the second data element is encrypted in the database; and return the decrypted second data element in a result of the second query.

15. The computing device of claim 14, wherein the encrypted first data element comprises embedded information identifying a first encryption key, and the second data element comprises embedded information identifying a second encryption key.

16. The computing device of claim 13, wherein the first data element is encrypted using format-preserving encryption.

17. The computing device of claim 13, the instructions further executable to:

in response to a setting of an encryption policy, terminate the transition mode in the database.

* * * * *